(12) United States Patent
Yukawa et al.

(10) Patent No.: US 7,788,002 B2
(45) Date of Patent: Aug. 31, 2010

(54) FAULT DATA MANAGEMENT

(75) Inventors: Steven J Yukawa, Seattle, WA (US);
Tim W Anstey, Seattle, WA (US);
Steven R Ecola, Sammamish, WA (US);
David L Allen, Kent, WA (US)

(73) Assignee: The Boeing Company, Chicago, IL (US)

( * ) Notice: Subject to any disclaimer, the term of this patent is extended or adjusted under 35 U.S.C. 154(b) by 183 days.

(21) Appl. No.: 11/199,399

(22) Filed: Aug. 8, 2005

(65) Prior Publication Data
US 2007/0033277 A1 Feb. 8, 2007

(51) Int. Cl.
*G01M 17/00* (2006.01)
*G06F 7/00* (2006.01)
*G06F 19/00* (2006.01)

(52) U.S. Cl. .................... 701/29; 701/14; 701/24; 701/30; 701/33; 701/34; 701/35; 340/853.2; 340/945; 340/963

(58) Field of Classification Search ................ 455/431, 455/427, 422; 701/14, 24, 29, 30, 33, 34, 701/35; 340/853.2, 945, 963
See application file for complete search history.

(56) References Cited

U.S. PATENT DOCUMENTS

| 4,943,919 | A | * | 7/1990 | Aslin et al. ................ 701/3 |
| 5,894,323 | A | | 4/1999 | Kain et al. ................ 348/116 |
| 5,931,877 | A | * | 8/1999 | Smith et al. ................ 701/29 |
| 6,064,922 | A | | 5/2000 | Lee ................ 701/3 |
| 6,092,008 | A | * | 7/2000 | Bateman ................ 701/14 |
| 6,266,736 | B1 | | 7/2001 | Atkinson et al. ............ 711/103 |
| 6,816,728 | B2 | | 11/2004 | Igloi et al. ................ 455/431 |
| 6,859,688 | B1 | | 2/2005 | Orf et al. ................ 701/3 |
| 6,894,611 | B2 | | 5/2005 | Butz et al. ................ 340/539.1 |
| 7,020,708 | B2 | | 3/2006 | Nelson et al. ................ 709/230 |

(Continued)

OTHER PUBLICATIONS

Cellular Networking Perspectives, 2002, © Feb. 21, 2004: Cellular Networking Perspectives Ltd., http://www.cnp-wireless.com/ArticleArchive/Wireless20Telecom/2002Q3-SMSIntrworking.htm.

(Continued)

*Primary Examiner*—Patrick N Edouard
*Assistant Examiner*—Shantell Heiber
(74) *Attorney, Agent, or Firm*—Harness, Dickey & Pierce, P.L.C.

(57) ABSTRACT

A system and method are provided for managing mobile platform fault data. The method includes automatically collecting raw fault data regarding at least one fault that occurs onboard the mobile platform utilizing a central maintenance computer (CMC) onboard the mobile platform. The raw fault data is automatically transmitted from the CMC to an onboard computer system (OCS) of the mobile platform and to a central computer system (CCS) located remotely from the mobile platform. The method additionally includes automatically generating at least one electronic mobile platform cabin (MPC) draft fault report from the raw data utilizing a first portion of an electronic logbook function (ELB1) of the OCS. Execution of the ELB1 additionally generates a MPC draft fault report notification message viewable on an OCS display and is automatically downloaded to the CCS. The method further includes automatically correlating the MPC draft fault report with the raw fault data utilizing a second portion of the electronic logbook (ELB2) of the CCS.

26 Claims, 2 Drawing Sheets

U.S. PATENT DOCUMENTS

| | | | | |
|---|---|---|---|---|
| 2002/0143443 | A1* | 10/2002 | Betters et al. | 701/29 |
| 2002/0143445 | A1* | 10/2002 | Sinex | 701/29 |
| 2003/0003872 | A1 | 1/2003 | Brinkley et al. | 455/66 |
| 2003/0061435 | A1 | 3/2003 | Ferguson et al. | 711/103 |
| 2003/0069015 | A1* | 4/2003 | Brinkley et al. | 455/431 |
| 2004/0056766 | A1 | 3/2004 | Butz et al. | 340/539.1 |
| 2005/0026608 | A1 | 2/2005 | Kallio et al. | 455/431 |
| 2005/0065725 | A1* | 3/2005 | Jeon et al. | 701/213 |
| 2006/0047381 | A1 | 3/2006 | Nguyen | 701/29 |

OTHER PUBLICATIONS

Wireless Messaging Suite, Mobile Messaging Platform, undated but effective as of Jul. 7, 2005; http://www.hssworld.com/commapps/smsc/faq.htm.

Flextronics Software Systems, FAQs; undated—web site last updated May 3, 2004 and effective as of Jul. 7, 2005; http://www.hssworld.com/commapps/smsc/faq.htm.

Core—Free FTP client software—Core FTP LE; Web site © 2003 Cre FTP; site effective as of Jul. 7, 2005; http://www.coreftp.com.

Tucows, PC Police Professional version 1.0.1, version date May 3, 2005; article undated but effective Jul. 7, 2005; web site © 2005 Tucows Inc; http://www.tucows.com/preview/342212.

Download Managers—Free Software; undated- Links active as of Sep. 4, 2004; effective Jul. 7, 2005; site © 1997-2004 Alan Sawicki http://freeware.intrastar.net/downloads.htm.

Microsoft Office Online, About e-mail security; undated; Web site © 2005 Microsoft Corporation; effective Jul. 7, 2005; http://office.microsoft.com/en-us/assistance/HP030834341033.aspx.

Cellular Networking Perspectives, 2002, http://www.cnp-wireless.com/ArticleArchive/Wireless20Telecom/2002Q3-SMSIntrworking.htm.

Wireless Messaging Suite, Mobile Messaging Platform, http://www.hssworld.com/commapps/smsc/faq.htm.

Flextronics Software Systems, FAQs; http://www.hssworld.com/commapps/smsc/faq.htm.

Core—Free FTP client software—Core FTP LE; http://www.coreftp.com.

Tucows, PC Police Professional; http://www.tucows.com/preview/342212.

Download Managers—Free Software; http://freeware.intrastar.net/downloads.htm.

Microsoft Office Online, About e-mail security; 2005; http://office.microsoft.com/en-us/assistance/HP030834341033.aspx.

* cited by examiner

FAULT DATA MANAGEMENT

FIELD

The disclosure relates generally to the capture and recording of mobile platform fault report data that occur onboard a mobile platform. More particularly, the disclosure relates to the coordination of fault data sent to a remote central computer system (CCS) from a central maintenance computer (CMC) onboard the mobile platform with fault data sent to the CCS from an electronic travel aid utilized by mobile platform crew to record fault data.

BACKGROUND

Airlines and other mobile platform providers, such as companies that provide passenger and/or cargo transportation by bus, train or ship, often maintain travel metrics and fault data during operation of the mobile platform. Metrics data generally include information and data regarding such things as origin and destination information for the mobile platform, passenger information and flight crew information, travel times, fueling information, etc. Fault data generally include data detailing problems with the mobile platform that were detected during the operation of the mobile platform, e.g. a solenoid misfire or the temperature of a component is out of range. Some known mobile platform fault detection and recording systems automatically detect faults that occur and transmit the fault data to a remote central computer system (CCS) where it is stored and made accessible by maintenance crews. Additionally, some known mobile platforms implement electronic travel aids utilized by crew of the mobile platform to enhance ease and efficiency of many tasks performed during operation of the mobile platform.

Furthermore, some mobile platform providers have implemented logbook applications in the electronic travel aids that are utilized by the mobile platform crew to record faults observed during operation of the mobile platform. Such electronic logbooks typically include electronic forms that are utilized by crew onboard the mobile platform during operation of the mobile platform. Typically, the electronic travel aids need to be removed from the mobile platform to download the metric and logbook data to the remote CCS where the data is stored in electronic databases. Recently, some mobile platform providers have implemented software applications that communicate, i.e. download, the data from the electronic travel aids, e.g. metric data and logbook data, to the CCS.

Although the mobile platform fault detection and recording systems accurately and systematically monitor many potential mobile platform faults, there currently is no automated link between the fault detection and recording systems and electronic logbooks. Therefore, the mobile platform crew has to manually complete the electronic forms generated by the logbook application. Such fault data entry tasks are time consuming, prone to errors, and often lack enough detail for efficient mobile platform troubleshooting and repair, which increase maintenance costs and reduce reliability.

Thus, there is need to enable such electronic logbooks to automatically monitor mobile platform fault detection and recording systems, automatically create draft fault reports in the logbooks, and provide the crew with automated messages that a fault report has been automatically generated, whereby the crew can review and verify the fault report.

BRIEF SUMMARY

In various embodiments of the present disclosure a system and method are provided for managing mobile platform fault data. The method includes automatically collecting raw fault data regarding at least one fault that occurs onboard the mobile platform utilizing a central maintenance computer (CMC) onboard the mobile platform. The raw fault data is automatically transmitted from the CMC to an onboard computer system (OCS) of the mobile platform and to a central computer system (CCS) located remotely from the mobile platform. The method additionally includes automatically generating at least one electronic mobile platform cabin (MPC) draft fault report from the raw data utilizing a first portion of an electronic logbook function (ELB1) of the OCS. Execution of the ELB1 additionally generates a MPC draft fault report notification message viewable on an OCS display and is automatically downloaded to the CCS upon acceptance by the crew of the mobile platform. The method further includes automatically correlating the MPC draft fault report with the raw fault data utilizing a second portion of the electronic logbook (ELB2) of the CCS.

The features, functions, and advantages of the present disclosure can be achieved independently in various embodiments of the present disclosure or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description of various embodiments is merely exemplary in nature and is in no way intended to limit the disclosure, its application or uses. Additionally, the advantages provided by the various embodiments, as described below, are exemplary in nature and not all embodiments provide the same advantages or the same degree of advantages.

Figure 1:
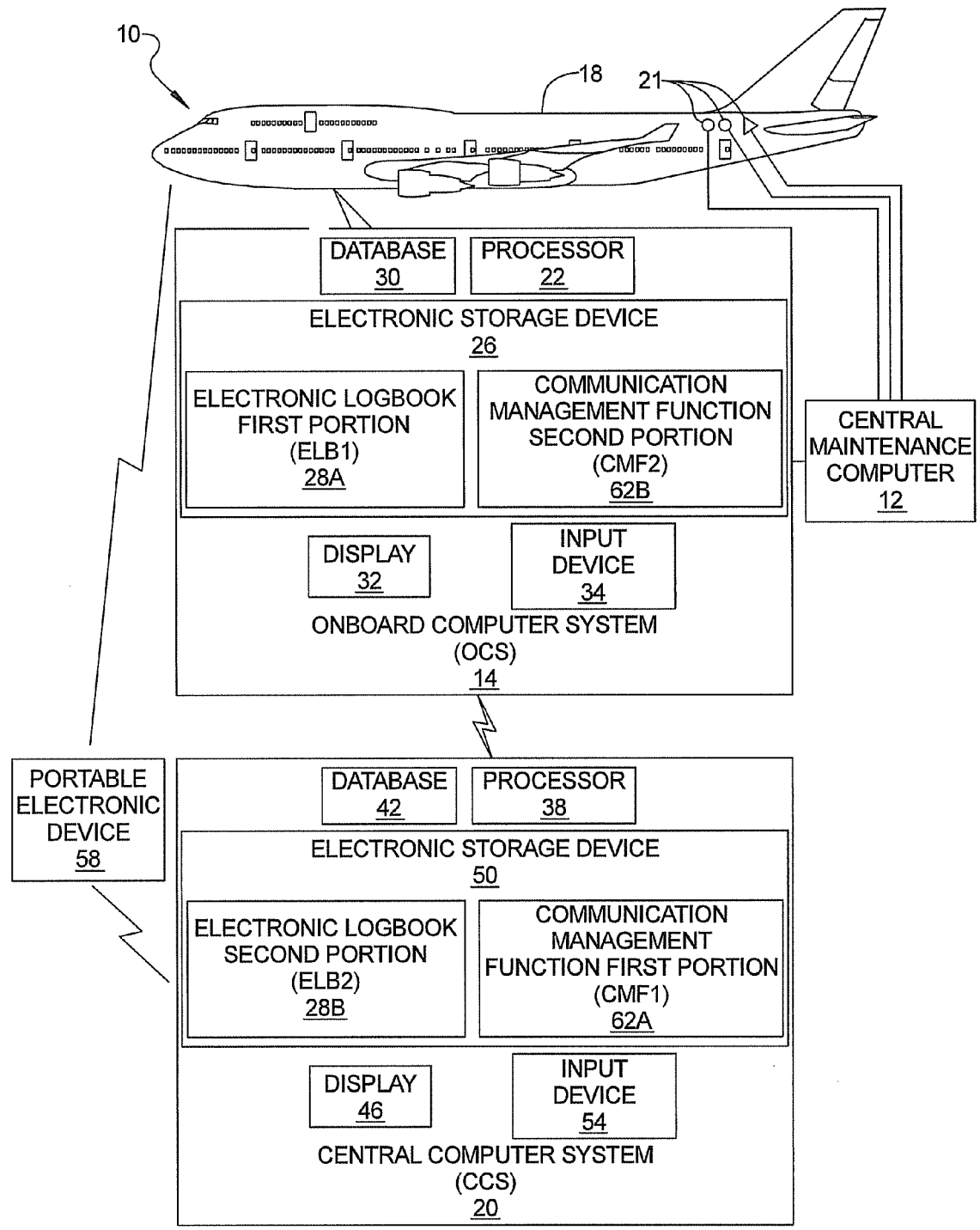
FIG. 1 is a block diagram of a data acquisition and storage (DASS) system, in accordance with various embodiments of the present disclosure.

FIG. 1 is a block diagram of a data acquisition and storage system (DASS) 10, in accordance with various embodiments of the present disclosure. The DASS 10 includes at least one central maintenance computer (CMC) 12 and at least one onboard computer system (OCS) 14 onboard a mobile platform 18. Although the mobile platform 18 is illustrated as an aircraft, the disclosure is not limited to aircraft applications. That is, the mobile platform 18 could be any mobile platform such as an aircraft, bus, train or ship. The DASS 10 additionally includes at least one central computer system (CCS) 20 remotely located from the mobile platform 18 and configured to communicate with the CMC 12 and the OCS 14. Communications between the OCS 14, i.e. the CMC 12, and the CCS 20 can be established using any suitable wired or wireless communications link, protocol or service. For example, in various embodiments a wireless connection is established between the OCS 14 and the CCS 20 using GPRS (General Packet Radio Service), VHF, wireless IEEE 802.11 communication and/or satellite networks that implement either Internet or ACARS<sup>SM</sup> (Airplane Communications and Recording System) protocols. ACARS<sup>SM</sup> can be provided by ARINC, Inc. of Annapolis, Md. or SITA of Geneva, Switzerland.

The CMC 12 is communicatively connected to the OCS 14 and to a plurality of sensors, meters, and various other mobile platform subsystems 21. The CMC 12 monitors the sensors, meters and subsystems 21 to automatically detect faults that occur during operation of the mobile platform 18 and collects fault data regarding the detected faults. The fault data includes data that details problems with the mobile platform 18 or problems with any system or subsystem of the mobile platform 18 that were detected during the operation of the mobile platform 18, e.g. a solenoid misfire or the temperature of a component is out of range. The CMC 12 automatically transmits the fault data to the CCS 20 where it is stored and made accessible by maintenance crews.

The OCS 14 can be a stand alone system or a subsystem of any other system, network or component onboard the mobile platform 18. For example, in various embodiments the OCS 14 is an electronic travel aid utilized by an operator of the mobile platform 18 to enhance ease and efficiency of many tasks the operator must perform during operation of the mobile platform 18. An exemplary electronic travel aid utilized by some airlines is referred to as an electronic flight bag (EFB). Alternatively, the OCS 14 can be a subsystem of an onboard LAN or any other onboard mobile platform control system.

The OCS 14 includes a processor 22 for executing all functions of the OCS 14 and an electronic storage device (ESD) 26 for electronically storing a first portion 28A of an electronic logbook (ELB) software application 28, and other applications, data, information and algorithms. The first portion 28A of the ELB software application 28 will be referred to herein as simply the ELB1 28A. The OCS additionally includes a database 30. The OCS database 30 is an electronic memory device, i.e. computer readable medium, for storing large quantities of data organized to be accessed and utilized during various operation of the DASS 10. For example, a plurality of look-up tables containing maintenance data, fault data, maintenance procedures and mobile platform metrics may be electronically stored on the OCS database 30 for access and use by the DASS 10 and users of the DASS 10.

The OCS ESD 26 can be any computer readable medium device suitable for electronically storing such things as data, information, algorithms and/or software programs executable by the OCS processor 22. For example, the OCS ESD 26 can be a hard drive, a Zip drive, a CDRW drive, a thumb drive or any other electronic storage device. The OCS 14 additionally includes a display 30 for illustrating graphical and textual data, forms and other information, and an input device 34 such as a keyboard, mouse, stylus, touch screen or joy stick for inputting data and information to the OCS 14 to be stored on the OCS ESD 26. It should be understood that the OCS processor, ESD, display and input device 22, 26, 30 and 34 can be components of a stand alone computer based system, i.e. the OCS 14, or components of a larger system, such as an onboard LAN or an onboard mobile platform control system that collectively comprise the OCS 14. Alternatively, the OCS 14 can be a stand alone system that is connectable to a larger system, e.g. an onboard LAN, such that various ones of the OCS processor, ESD, display and input device 22, 26, 30 and 34 are included in the stand alone OCS 14 and others are included in the larger system.

The ELB1 28A is executed by the OCS processor 22 and utilized by mobile platform crew to enter mobile platform metrics and fault data and store the data in the OCS ESD 26 as the mobile platform travels from its origination point to its destination. The OCS 14 is adapted to communicate the data to the CCS 20 as the mobile platform 18 is in transit or when the mobile platform reaches a mobile platform destination terminal that can include the CCS 20. Generally, the OCS 14 selectively communicates the data to the CCS 20 via an automatically selected communication means, e.g. an automatically selected wireless communication channel. That is, the OCS 14 will communicate the data to the CCS 20 using an automatically selected one of a plurality of available communication channels. For example, if a general packet radio service (GPRS) channel, a wireless IEEE 802.11 channel, a VHF and satellite networks channel and a broadband satellite are available, the OCS 14 will automatically select a desired channel and communicate the data to the CCS 20 via that selected channel. A system and method for automatically selecting a desired one of a plurality of communications channels is described in a co-pending patent application titled, "Automated Integration of Fault Reporting", Ser. No. 11/191,645, and assigned to The Boeing Company and is incorporated by reference herein in its entirety.

Figure 2:
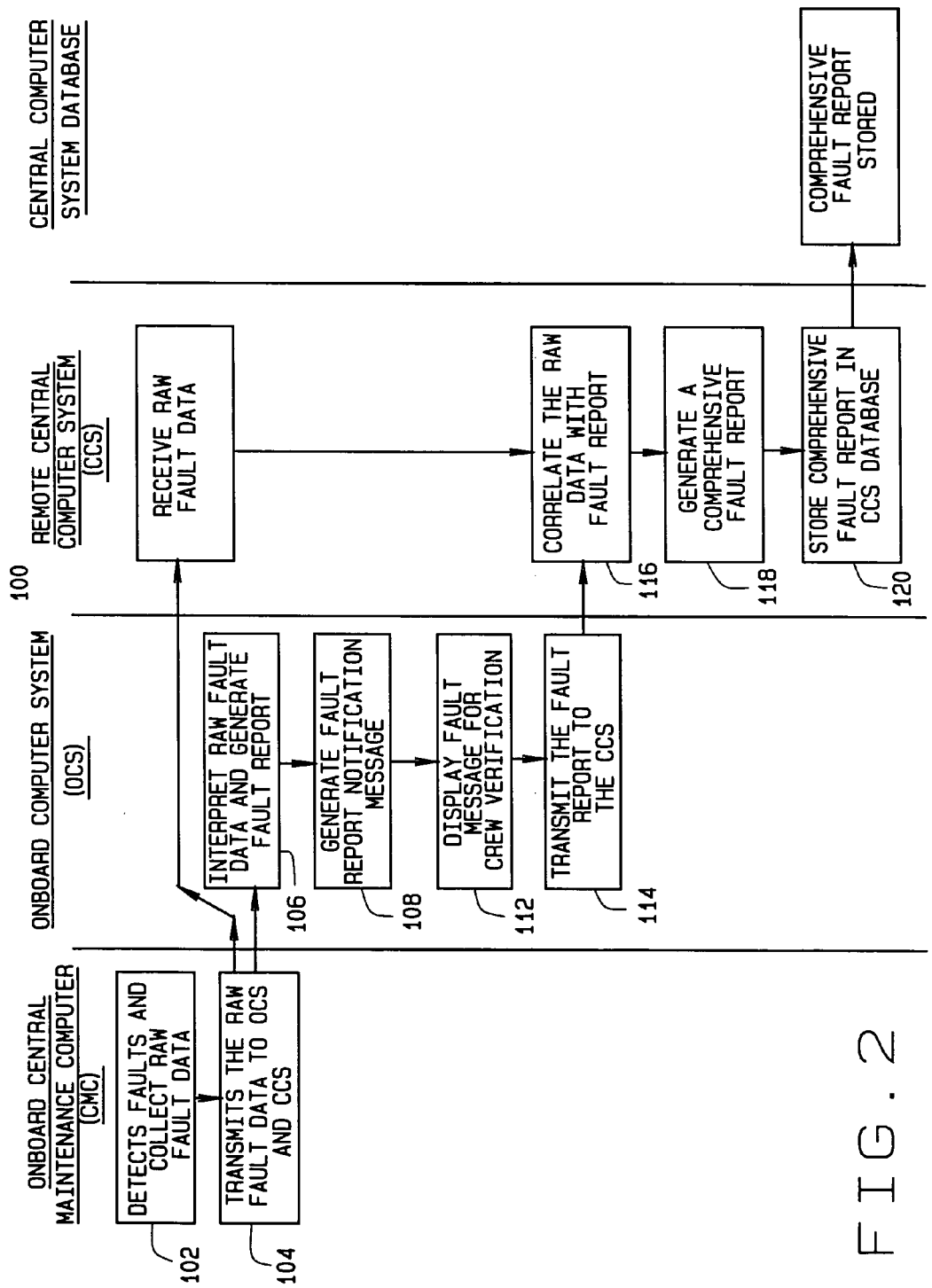
FIG. 2 is a flow chart illustrating an operation of the DASS, shown in FIG. 1, whereby metric and fault data is automatically sensed, recorded, sent from an onboard computer system to a central computer system, and correlated in accordance with various embodiments of the present disclosure.

Referring now to FIG. 2, a flow chart 100 is provided that illustrates operation of the DASS 10, whereby metric and fault data is automatically sensed, recorded, sent from the OCS 14 to the CCS 20, and correlated, in accordance with various embodiments of the present disclosure. As described above, the CMC 12 monitors the sensors, meters and subsystems 21 to automatically detect faults and collect fault data during operation of the mobile platform 18, as indicated at 102. The CMC 12 then automatically transmits the fault data to the CCS 20 where the data is stored. Additionally, the OCS processor 22 executes the ELB1 28A such that the OCS 14 communicates with the CMC 12 so that the fault data is also sent to the OCS 14, as indicated at 104. The ELB1 28A interprets the fault data and generates one or more electronic fault log forms that has one or more interactive data fields containing a description of the fault, as indicated at 106.

More specifically, the ELB1 28A interprets the fault data from the CMC 12, translates the data in to text, symbols and/or codes interpretable by the mobile platform crew. The ELB1 28A inserts the text, symbols and/or codes into one or more appropriate interactive information and data fields of the fault log form, thereby at least partially pre-completing the fault log form. The at least partially pre-completed fault log form will be referred to herein as a draft fault report. In various embodiments, the ELB1 28A displays the at least partially pre-completed fault log form, i.e. draft fault report, on the OCS display 32 where it is viewable by the mobile platform crew. In various other embodiments, when the ELB1 28A generates the draft fault report, the ELB1 28A generates a fault notification message, viewable by the mobile platform crew, indicating a draft fault report has been generated, as indicated at 108. The fault notification message can be in the form of a 'pop-up' type message presented on the OCS display 30, illumination of a light or LED viewable by the crew, presenting a symbol or icon on the OCS display 30, an audible tone, ring or sound generated by the OCS 14, or any other suitable message that informs the crew that a fault log form has been generated and at least partially pre-completed by the ELB1 28A.

When a fault notification message is generated, the mobile platform crew can choose to view the draft fault report immediately or at a later, more convenient time. Not all faults detected and recorded by the CMC 12 are observable by the mobile platform crew. Faults occurring that are observable by the mobile platform crew are referred to herein as mobile platform cabin (MPC) faults. MPC faults can be any fault observable by the mobile platform crew throughout the mobile platform 18. In various embodiments, when the CMC 12 detects a fault, the CMC 12 will identify the fault as a MPC fault or a non-MPC fault. If the fault is identified as an MPC fault, the CMC 12 will assign an identification code to the fault that identifies the fault as a MPC fault and classifies the fault as a specific type or class of MPC fault. That is, the CMC 12 will include identification data in the fault data communicated to the OCS 14 that identifies the fault as a MPC fault and classifies the fault as specific type or class of MPC fault. For example, the fault may be classified based on the urgency of response needed to the fault, or the type of sensor, meter or sub-system 21 that detected the fault, or both. Subsequently, when the ELB1 28A interprets the fault data, if the fault is identified as a MPC fault the ELB1 28A will pre-complete a draft fault report as described above. Additionally, the ELB1 28A will generate a notification message that properly indicates to the crew the type or class of MPC fault. Therefore, the crew can easily decide when the draft fault report should be viewed. If the fault is identified as a non-MPC fault the ELB1 28A will disregard the fault data.

When the crew desires to view the draft fault report, the ELB1 28A allows the crew member view the draft fault report whereby the crew can verify, edit, accept or reject the particular MPC draft fault report, as indicated 112. Additionally, if the fault log form has interactive fields that are not pre-completed by the ELB1 28A, the crew can complete these fields using the OCS input device 34. Thus, the crew can compare the description of the MPC fault generated by the CMC 12 with what was observed within the mobile platform cabin, complete uncompleted fault log fields, and verify, edit, accept or reject the particular MPC fault log entry accordingly. Alternatively, the crew can decide to postpone completing and accepting/rejecting the MPC fault log entry on until a later time. The OCS processor 22 stores the MPC draft fault report, whether completed, not completed, accepted or rejected in the OCS ESD 26 to be downloaded to the CCS 20, as described below. Thus, the ELB1 28A pre-completes various fault data fields of the fault data log forms, thereby saving the mobile platform crew from having to enter a description of the fault by hand and also providing a more accurate and detailed description of the fault.

It should be understood that in addition to the ELB1 28A interpreting CMC 12 fault data and pre-completing MPC draft reports for the crew, the ELB1 28A also provides blank log forms that can be utilized by the crew to create crew generated fault reports. That is, the ELB1 28A provides blank log forms in which the crew can input data and text, via OCS input device 34, into the interactive fields to describe a MPC or log a MPC fault report regarding a MPC that was not detected by the CMC 12. Generally, the ELB1 28A provides the ability for a crew member to navigate a fault manual included in the ELB1 28A to prepare and complete a fault report form. For example, the ELB1 28A provides text entry searches that essentially provide the ability to browse the fault manual and graphically 'drill' down through the fault manual to complete all the fields of the fault report.

The CCS 20 includes at least one processor 38, at least one database 42, at least one display 46, at least one electronic storage device (ESD) 50 and at least one input device 54. The CCS display 46 can be any display suitable for visually presenting graphics, text and data to a user of the DASS 10. The CCS input device 54 can be any device adapted to input data and/or information into CCS 20, for example a keyboard, a mouse, a joystick, a stylus, a scanner, a video device and/or an audio device. The CCS ESD 50 can be any computer readable medium device suitable for electronically storing a second portion 28B of the ELB 28, and such other things as data, information and algorithms and/or software programs executable by the CCS processor 38. For example, the COS ESD 50 can be a hard drive, a Zip drive, a CDRW drive, a thumb drive or any other electronic storage device. The second portion 28B of the ELB 28 will be referred to herein simply as the ELB2 28B.

The CCS database 42 is also an electronic memory device, i.e. computer readable medium, for storing large quantities of data organized to be accessed and utilized during various operation of the DASS 10. For example, a plurality of look-up tables containing maintenance data, fault data, maintenance procedures and mobile platform metrics may be electronically stored on the CCS database 42 for access and use by the DASS 10 and users of the DASS 10. The CCS processor 38 controls all operations of the CCS 20. For example, the CCS processor 38 controls communications and data transfers between the CCS 20 and the OCS 14 and between the CCS 20 and the CMC 12. The CCS processor 38 additionally controls displaying graphics and data on the CCS display 46, interpreting and routing information and data input by the CCS input device 54 and the executing various algorithms stored on the CCS ESD 50. Furthermore, the CCS processor 38 executes the ELB2 28B to store downloaded data in the CCS database 42. The downloaded data includes CMC 12 transmitted fault data, ELB fault reports transmitted by the ELB1 28A, which includes CMC 12 generated MPC fault reports that have been completed by the crew, and MPC fault reports generated by the crew. Further yet, the CCS processor executes the ELB2 28B to coordinate or correlate the fault data transmitted to the CCS 20 by the CMC 12.

In various embodiments, the DASS 10 further includes a portable electronic device (PED) 58, e.g. a laptop computer, PDA or any other such device, that communicates with the CCS 20 and/or OCS 14 via a wired or wireless connection. The PED 58 is adapted to access and utilize data stored in the CCS database 42 or the OCS database 30 and also to input data to the CCS 20 or OCS 14 to be stored in the CCS database 42 or OCS database 30 and uploaded to the OCS ESD 26 for utilization by the ELB1 28A, if desirable. The PED 58 displays logbook data in a format suitable for use as a work management tool utilized to return the mobile platform to service. The PED 58 can contain such information and data as lists of required work, e.g. work orders, deferred maintenance actions and unresolved fault reports and any other assigned work found in the CCS database 42 or the OCS database 30.

The mobile platform metrics and the MPC fault reports, as well as fault data detected the CMC 12 are downloaded, i.e. transmitted, from the OCS 14 and CMC 12 to the CCS 20, as indicated at 114. The downloaded metrics and fault data are correlated by the ELB2 28B, as indicated at 116. The correlated data can be shared with mobile platform performance monitoring and maintenance systems (not shown). The mobile platform performance monitoring and maintenance systems may be software applications stored on the CCS ESD 50 or may be separate computer based systems communicatively linked with the CCS 20 and/or the OCS 14. The mobile platform performance monitoring and maintenance systems ensure that regularly scheduled maintenance is performed and that the mobile platform 18 and all systems onboard are maintained in proper operational order. Additionally, the metrics and correlated fault reports stored in the CCS database 42 and/or the OCS database 30 can be accessed and utilized, via the PED 58, by maintenance personnel responsible for performing the maintenance and repairs to the mobile platform 18.

The CCS 20 further includes a first portion 62A of a communication management function (CMF) stored on the CCS ESD 50. A second portion 62B of the CMF is stored on the OCS ESD 26. The first and second portions 62A and 62B of the CMF will be respectively referred to herein as the CMF1 62A and the CMF2 62B and collectively referred to herein as the CMF 62. Generally, the CMF 62 provides application program interfaces (APIs) to allow the ELB1 28A and the ELB2 28B to communicate, as described in co-pending patent application titled, "Automated Integration of Fault Reporting", Ser. No. 11/191,645, and assigned to The Boeing Company, which is incorporated herein by reference in its entirety.

The fault data communicated to the CCS 20 by the CMC 12 will not be the exact same information and data included in the MPC fault reports communicated to the CCS 20 by the ELB1 28A of the OCS 14. However, CMC 12 fault data and the data included in ELB MPC fault reports will have content data that is very similar. For example, in MPC draft fault reports generated by the ELB1 28A, the ELB1 28A will interpret the fault data from the CMC 12 and assign a particular fault code to the fault, which is included in the MPC draft fault report. Thus, the MPC fault report sent to the CCS 20 by the OCS 14 will include a fault code, while the correlating CMC 12 fault data sent to the CCS 20 will not include the fault code. As a further example, the ELB1 may only interpret a portion of the data included in the CMC 12 fault data to generate the draft MPC fault report. Therefore, the OCS 14 MPC fault report sent to the CCS 20 may include less information regarding a particular fault than the correlating CMC 12 fault data sent to the CCS 20. As a still further example, the crew may edit or add information to a particular ELB MPC draft fault report such that the MPC fault report sent to the CCS 20 by the OCS 14 may include more information regarding a particular fault than the correlating CMC 12 fault data sent to the CCS 20.

To accommodate for such differences in data by the CMC 12 and the OCS 14, and to obtain the most comprehensive and accurate data regarding MPC faults, the ELB2 28B will correlate the fault data sent from the CMC 12 with the MPC fault reports sent from the OCS 14. More particularly, the ELB2 28B will identify the specific ELB MPC fault report message that relates to same fault as a specific CMC 12 fault data message. Therefore, the information included in a MPC fault report message generated by the ELB1 28A from specific fault data regarding a particular MPC fault detected by the CMC 12, as described above, will be matched by the ELB2 28B with the CMC 12 fault data message communicated to the CCS 20 regarding that specific MPC fault. The ELB2 28B will then compile, compare, correlate, coordinate and/or assimilate the fault data included in both the MPC fault report message and the CMC 12 fault data message, regarding a particular MPC fault, to generate a comprehensive MPC fault report, as indicated at 118. The comprehensive MPC fault report is then stored in the CCS 20 database 42 and made accessible to the mobile platform maintenance crew, via the PED 58, and to one or more mobile platform provider computer systems or networks, as indicated at 120.

It should be understood that CCS 20 could be communicating with a plurality of mobile platforms 18, each sending ELB MPC fault report messages and CMC 12 fault data messages to the CCS 20. Generally, all the ELB MPC fault report messages and CMC 12 fault data messages from each mobile platform are stored in the CCS database 42. Thus, the CCS processor 38 executes the ELB2 28B to correlate all the ELB MPG fault report messages and CMC 12 fault data messages from each mobile platform 18. In various embodiments, the ELB2 28B correlates the ELB MPC fault report messages with the CMC 12 fault data messages based on various fault attributes or characteristics, such as the type of fault, the fault identifier, an identification number of the mobile platform 18 from which the messages were sent, what time MPC faults occurred, etc.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification and following claims.

What is claimed is:

1. A method of managing mobile platform fault data, said method comprising:

detecting one or more faults onboard the platform, collecting raw fault data, classifying the one or more faults based on whether observable by a flight crew onboard the platform, and sending the raw fault data for observable faults to an electronic logbook (ELB) application of an electronic flight bag (EFB) onboard the platform, the detecting, collecting, classifying and sending performed by a maintenance computer on the mobile platform when the platform is in use;

interpreting at least some of the sent raw fault data, and based on the interpreting, providing to the flight crew a draft of an electronic logbook fault report of a given fault classified as observable, the draft report indicating a classification of the given fault based on urgency of response needed as to the given fault, the interpreting and providing performed by the EFB using the electronic logbook application;

using the electronic logbook application, the EFB interactively receiving from the flight crew observations by the fight crew of the given fault and completing the draft report with the observations to further describe the given fault; and comparing at least some of the collected raw fault data with the completed draft report.

2. The method of claim 1, further comprising:

using the maintenance computer, sending the collected fault data to a computer remote from the platform; and using the electronic logbook application, sending the completed draft report to the remote computer;

the comparing performed using the remote computer.

3. The method of claim 1, wherein the EFB is capable of standalone operation.

4. The method of claim 1, wherein the EFB interactively receives flight crew input editing the draft report.

5. The method of claim 1, wherein the EFB interactively receives flight crew rejection of the draft report.

6. The method of claim 1, further comprising combining at least some of the collected fault data with data in the electronic logbook fault report into a second fault report.

7. The method of claim 6, further comprising receiving the second fault report and providing data to the electronic flight bag (EFB) onboard the platform for use in maintenance of the platform, the providing performed via a portable electronic device (PED) in communication with the electronic flight bag and the remote computer.

8. The method of claim 6, further comprising comparing at least some of the collected raw fault data and the electronic logbook fault report with collected raw fault data and electronic logbook fault reports from other mobile platforms to obtain the second fault report.

9. The method of claim 1, the comparing performed to accommodate for a difference between the collected raw fault data and the electronic logbook fault report.

10. A method of managing mobile platform fault data, the method comprising:
  detecting one or more faults onboard the platform, collecting and sending raw fault data to a computer remote from the platform and to an electronic logbook application of an electronic flight bag (EFB) onboard the platform, and classifying the one or more faults based on whether observable by a flight crew onboard the platform, the detecting, collecting, sending, and classifying performed on the mobile platform by a maintenance computer;
  the EFB, using the electronic logbook application onboard the platform, interpreting at least some of the collected fault data, and based on the interpreting, pushing a notification to the flight crew of generation of a partial description, in a draft of an electronic logbook fault report, of a given fault classified as observable;
  the EFB, using the electronic logbook application, interactively allowing a flight crew member to supplement the draft report with one or more flight crew observations of the given fault to obtain a completed electronic logbook fault report; and
  using the remote computer, interpreting at least some of the collected raw fault data sent by the maintenance computer, the interpreting performed with reference to the completed electronic logbook fault report.

11. The method of claim 10, wherein two different sets of data pertaining to the same fault are provided from the platform to the remote computer.

12. The method of claim 10, comprising allowing the flight crew member to compare a flight crew observation with fault data as interpreted and provided in the partial description.

13. The method of claim 10, further comprising allowing the flight crew member to edit the partial description.

14. The method of claim 10, further comprising allowing the flight crew member to reject the partial description.

15. A system for managing mobile platform fault data, the system comprising:
  a maintenance computer on the mobile platform, the maintenance computer configured to detect faults on the platform, collect raw fault data, and classify detected faults based on whether observable by a flight crew onboard the platform;
  an onboard electronic flight bag (EFB) having an electronic logbook (ELB) application, the ELB application configured to interpret at least some of the collected fault data, and based on the interpreting, provide a partial description to the flight crew, in a draft electronic logbook fault report, of a given fault classified as observable;
  the electronic logbook application further configured to interactively receive, from the flight crew, one or more observations by the flight crew of the given fault for inclusion in, and to supplement, the electronic logbook fault report; and
  a computer remote from the platform and configured to receive the raw fault data from the maintenance computer, to receive the supplemented electronic logbook fault report from the ELB application, and to coordinate at least some of the raw fault data sent by the maintenance computer with the one or more observations included in the supplemented electronic logbook fault report.

16. The system of claim 15, wherein for the given fault the maintenance computer provides raw fault data that differs at least in part from fault data provided by the ELB application in the supplemented electronic logbook fault report.

17. The system of claim 15, wherein the onboard EFB is capable of standalone operation.

18. The system of claim 15, wherein the ELB application is configured to include, in the supplemented electronic logbook fault report, flight crew input verifying the partial description.

19. The system of claim 15, further comprising a portable electronic device (PED) in communication with the EFB and the remote computer; wherein the PED is configured to receive the supplemented electronic logbook fault report and fault data and to input data to the EFB for use in maintenance of the platform.

20. An aircraft comprising:
  an onboard maintenance computer configured to detect faults, to collect raw fault data from a plurality of onboard sources, and to send the raw fault data to a remote computer;
  an onboard electronic flight bag (EFB) including an electronic logbook (ELB) application configured to receive the raw fault data from the maintenance computer and to communicate with the remote computer;
  the onboard maintenance computer further configured to identify the fault data to the ELB application based at least in part on whether a fault is observable by a flight crew onboard the aircraft;
  the ELB application further configured to:
    interpret fault data relating to a given fault identified as observable;
    push to the flight crew a notification of availability of a draft ELB fault report based on the interpretation;
    interactively receive one or more flight crew observations of the given fault and supplement the draft ELB fault report with the one or more observations; and
    during flight, send the supplemented report to the remote computer for comparison with the raw fault data sent by the onboard maintenance computer.

21. The aircraft of claim 20, wherein the onboard EFB is capable of standalone operation.

22. The aircraft of claim 20, wherein for the given fault the maintenance computer sends raw fault data to the remote computer that differs at least in part from the supplemented report sent via the ELB application to the remote computer.

23. The aircraft of claim 20, wherein the onboard maintenance computer is further configured to identify an observable fault to the ELB application based on urgency of response.

24. A system for managing mobile platform fault data, the system comprising:
  a maintenance computer configured onboard the mobile platform to detect occurrence of faults in the operational behavior of the platform, collect raw fault data, and, during operation of the platform, classify detected faults based on whether observable by a flight crew onboard the platform;
  an onboard electronic flight bag (EFB) including an electronic logbook (ELB) application, the ELB application configured to interpret at least some of the collected fault data, and based on the interpreting, provide a partial description, in a draft ELB fault report and during operation of the platform, of a given fault classified as observable;

the electronic logbook application further configured to notify the flight crew during operation of the platform that a draft ELB fault report is pending and to interactively receive flight crew input in the draft ELB fault report to supplement the partial description; and a computer remote from the platform and configured to receive the raw fault data from the maintenance computer, to receive the supplemented ELB fault report from the ELB application, and to coordinate at least some of the raw fault data sent by the maintenance computer with the supplemented fault description in the supplemented ELB fault report.

25. The system of claim 24, wherein the maintenance computer is configured to identify a type of subsystem that detected an observable fault and to classify the observable fault based on response urgency.

26. The system of claim 24, wherein the electronic logbook application is further configured to interactively receive flight crew input in an ELB fault report form to report an observable fault not detected by the maintenance computer; the remote computer configured to receive the ELB fault report form from the ELB application.

* * * * *